US011270022B2

(12) United States Patent
Straw

(10) Patent No.: US 11,270,022 B2
(45) Date of Patent: Mar. 8, 2022

(54) SENSITIVE DATA MOVEMENT DETECTION

(71) Applicant: Code 42 Software, Inc., Minneapolis, MN (US)

(72) Inventor: Scott Straw, Blaine, MN (US)

(73) Assignee: Code 42 Software, Inc., Minneapolis, MN (US)

( * ) Notice: Subject to any disclaimer, the term of this patent is extended or adjusted under 35 U.S.C. 154(b) by 265 days.

(21) Appl. No.: 16/194,090

(22) Filed: Nov. 16, 2018

(65) Prior Publication Data
US 2020/0159953 A1    May 21, 2020

(51) Int. Cl.
    *G06F 21/62* (2013.01)
    *G06F 16/13* (2019.01)
    *G06F 16/17* (2019.01)
    *G06F 16/11* (2019.01)

(52) U.S. Cl.
    CPC ........ *G06F 21/6245* (2013.01); *G06F 16/119* (2019.01); *G06F 16/137* (2019.01); *G06F 16/1734* (2019.01)

(58) Field of Classification Search
    None
    See application file for complete search history.

(56) References Cited

U.S. PATENT DOCUMENTS

| | | | |
|---|---|---|---|
| 7,263,190 B1* | 8/2007 | Moritz | G06F 21/6245 380/258 |
| 10,235,372 B1* | 3/2019 | Kesarwani | G06F 16/148 |
| 2005/0198215 A1* | 9/2005 | Helmerich | H04L 41/0843 709/220 |
| 2014/0181119 A1* | 6/2014 | Chiueh | G06F 16/137 707/747 |
| 2015/0169898 A1* | 6/2015 | Lembcke | G06Q 50/186 726/28 |
| 2015/0213032 A1* | 7/2015 | Powell | G06F 3/067 707/827 |
| 2015/0324606 A1* | 11/2015 | Grondin | G06F 3/0482 726/1 |
| 2017/0024551 A1* | 1/2017 | Phadke | G06F 21/16 |
| 2018/0107838 A1* | 4/2018 | Amarendran | G06F 21/6245 |
| 2021/0158238 A1* | 5/2021 | Clearwater | G06Q 10/067 |

* cited by examiner

*Primary Examiner* — Simon P Kanaan
(74) *Attorney, Agent, or Firm* — Schwegman Lundberg & Woessner, P.A.

(57) ABSTRACT

Systems and techniques for sensitive data movement detection are described herein. An attempt to relocate a file that is a member of a monitored data set may be identified. A user account associated with the attempt to relocate the file may be determined. A safe user group may be identified for the user account associated with the attempt to relocate the file. A destination may be obtained for the attempt to relocate the file. A safe zone may be determined for the monitored data set using the user account and the identification of the monitored data set. A notification may be provided based on the destination for the attempt to relocate the file and the safe user group and the safe zone.

20 Claims, 5 Drawing Sheets

SENSITIVE DATA MOVEMENT DETECTION

TECHNICAL FIELD

Embodiments described herein generally relate to computer data storage security and, in some embodiments, more specifically to movement detection for sensitive data files.

BACKGROUND

Network file systems may store a variety of data. The data may be stored centrally or may be distributed across the network among a variety of user drives, server devices, network attached storage devices, and the like. The network file system may be accessible by a variety of user devices. A user may use a device to move a file from one location to another within the network file system. Some files within the network file system may contain data that may be considered as sensitive. There may be a desire to prevent sensitive data from moving to unauthorized locations or devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
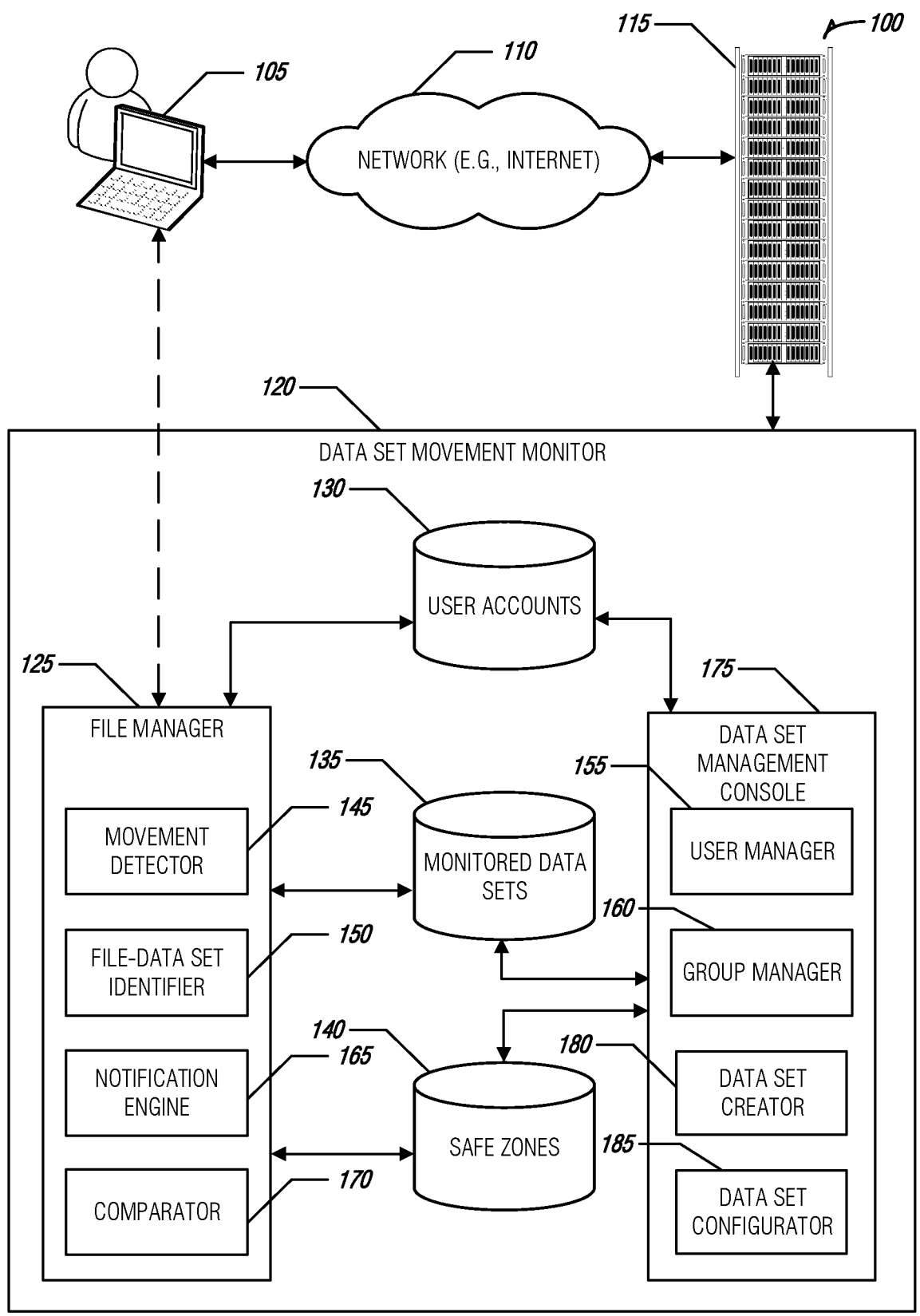
FIG. 1 is a block diagram of an example of an environment and system for sensitive data movement detection, according to an embodiment.

Network file systems may provide access to a large variety of files by a plurality of users. The files may be spread across the network with file locations including user computing devices, mobile devices, centralized storage systems, and the like. In addition, the network file system may manage portable or offline storage location such as portable hard drives, thumb drives, CD-ROM drives, and the like. In an example, a client application may be provided for user devices that provides a storage management function for client devices that manages local storage locations of the user computing device.

Controlling the locations where files may be located may prevent unintentional data loss and security breaches through unauthorized data egress. Traditional techniques of managing file movement may use access control lists to determine locations where a user may write, modify, or delete files. However, the traditional techniques may only be able to manage server storage locations. Traditional file movement management techniques may only provide a binary approach to file movement management by either allowing or denying a file move at the folder level. The traditional file movement management techniques may not be able to provide file movement management at the file level. Managing file movement at the file level may allow for control of the movement of files that may have been modified in an attempt to make the file look different than the original. For example, a user may attempt to change a file name or extension in an attempt to move a file to an unauthorized location.

The systems and techniques discussed herein address the shortcomings of traditional file movement management techniques by managing file movement across storage locations spread throughout the network file system. File movement may be controlled and monitored across a plurality of storage locations including for example, server storage locations, user computing device storage locations, external storage devices (external hard drives, USB drives, etc.), etc. The system and techniques discussed herein provide advanced file movement management using sensitive data set creation, sensitive data set configuration, endpoint monitoring, detection, and reporting.

As used herein, a sensitive data set is a set of files and directories identified by a user (e.g., organization, group, individual user, etc.) of the network file system which they consider sensitive in some way. A safe zone, as used herein, is a set of identified user-relative locations which the user accepts as acceptable locations for a sensitive data set. Locations may include user's endpoints, enterprise file synchronization and sharing (EFSS) locations, removable media, etc. As used herein, a safe group is a set of network file system users and organizations whose endpoints are acceptable locations for files in a sensitive data set. Default safe zone settings as used herein are safe zone settings to apply to any users and organizations added to a safe group. A sensitive data set administrator, as used herein, is a network file system user who may change a sensitive data set configuration (e.g., may add/remove files, modify safe zone and safe group of the sensitive data set, etc.). As used herein, a data set contact is a contact that may receive notification of suspicious movement of files in the sensitive data set. An identification model, as used herein, is a method used to identify sensitive data. As used here, an identity table is a table of information used to identify sensitive data files. The table contains entries for each file that specify identification methods and the data used to identify a match using the designated identification method.

Sensitive data set creation allows a system administrator to create a new sensitive data set (e.g., via an administration console, etc.). The sensitive data set may be assigned a name (e.g., automatically, by the administrator, etc.) and one or more users of the network file system may be assigned as sensitive data set administrators of the sensitive data set. A notification may be transmitted (e.g., automatically, by the administrator, etc.) to the one or more users that they may configure the sensitive data set.

Sensitive data set configuration allows the sensitive data set administrators to view and edit (e.g., via a configuration console, etc.) the sensitive data set configuration for the sensitive dataset. The data set administrators may be able to perform a variety of configuration tasks to configure the sensitive data set including:

Rename the sensitive data set

Set a default identification method(s) to use for detecting files

Identify sensitive files and directories

Update the identification method(s) to use for specific files

Set a default safe zone

Add users and groups (e.g., user groups, organizations, etc.) to a safe group of the sensitive data set Adjust safe zone settings for individual users and groups in the safe group Update the contact(s) and alert settings for the sensitive data set and Enable/disable monitoring of the sensitive data set The system administrator may add or remove sensitive data set administrators from the sensitive data set configuration. The system administrator may add or remove sensitive data sets. Removal of a sensitive data set may remove movement detection for the sensitive data set, but the removal may not modify file data for locations designated in the sensitive data set configuration.

Endpoint monitoring may detect file movement in normal operation. Endpoint monitoring may use a balanced architecture and algorithms to detect movement of files in the sensitive data set to minimize endpoint resource utilization and network bandwidth utilization. The network file system servers may cooperate with client devices of the network file system to identify movement of files that are members of the sensitive data set and may make a record of any file movements or file movement attempts. The record may include information such as, for example, which file(s) are involved, whether the file(s) were moved from an endpoint of a user or appeared on the endpoint of the user, a source and destination, which identification method was used to identify the moved files, etc.

A detection feature may provide identification of files that are subjected to movement. Endpoint clients (e.g., a user computing device, laptop computer, desktop computer, mobile device, etc.) may retrieve and maintain a copy of an identity table for each sensitive data set that is defined for an organization (e.g., company, workgroup, device group, a user group for the user of the endpoint device, etc.) corresponding to the endpoint client. As file movement is detected from the endpoint device, each file is evaluated. Movement of the files in the sensitive data set is reported to a server of the network file system (or a microservice of the network file system, etc.).

In an example, new files added to sensitive locations (e.g., as defined in the sensitive data set configuration, etc.) may be automatically added to the sensitive data set. The endpoint clients for users that are part of a safe group for a sensitive data set (e.g., as defined in the sensitive data set configuration, etc.) retrieve and maintain a copy of safe zone locations (e.g., as defined in the sensitive data set configuration, etc.). If the safe user creates a new file in one of the safe zone locations, the identity of the file is sent to the server of the network file system. The file may then be added to the identity table. The updated identity table may be transmitted to the endpoint devices that are part of the organization.

The network file system server may run a periodic job to gather information about movement of files belonging the sensitive data set out of designated safe zone locations. This provides a file forensic feature allowing for tracking file movements throughout the network file system. If suspicious movement is detected, information regarding the suspicious activity for a reporting period may be transmitted (e.g., via email, text message, alert, etc.) to the sensitive data set administrators.

Identification methods may include mechanisms to evaluate files to determine if the files are part of the sensitive data set. The identification methods are employed when scanning files on an endpoint device during a file move operation and when copies of files are made by members of the safe group for the sensitive data set. The new copies may be automatically added to the sensitive data set. The identification methods may include, for example, hashing, file name matching, known text and data matching, etc.

Hashing may include generating a hash value for each file included in the sensitive data set. The hash value is saved in the identification table and is used to identify copies of the file that are subjected to a file move operation or have been created by a user. If the file changes, a new hash value is generated and stored in the identity table with the previous hash values. Thus, each version of the file may be identified as modifications are made. To reduce processor utilization and storage usage, quick hashes may be generated for the files. Quick hashes may be generated without reading an entire file. Rather, a portion of the file may be read and used to generate the hash. For example, the file metadata may be read, and a hash may be generated for the file metadata. Using quick hashes may provide benefits such as, for example, allowing for the generation of hash values with reduced processor and memory usage, generating hash values more quickly for large files, provides a relatively certain (e.g., 99%) identification of a file identity, etc. If necessary, a full file hash may be generated to verify the identity of the file.

File name matching may be used to identify files base on the file name. The file name may be stored in the identity table. When the file name is changed, the new file name may be added to the identity table. Thus, file name changes are tracked to that movement of the file may be tracked even if the file name is changed.

Known text and data identification may use file information to identify files that are subjected to move operations. The information may be included in the body of a file or may be included in metadata or other available file information. In an example, a string may be identified in the file and may be stored in the identification table for use in identifying the file. The data used may be unmodifiable by a user preventing the string from changing as the file is moved. If a change is made to the string or a new portion of text or data is used to identify the file, it will be stored in the identity table along with previous data used to identify the file.

Reporting may provide sensitive data set administrators with visibility into movement of files included in the sensitive data set. Administrators may be able to view reports such as, for example, suspicious and acceptable movement events over time, suspicious and acceptable movement events per user and organization, etc. A user interface may be generated for the sensitive data set administrators that may allow them to drill down to view a list of movement events and then drill down further to view details for individual events.

FIG. 1 is a block diagram of an example of an environment 100 and system 120 for sensitive data movement detection, according to an embodiment. The environment 100 may include an endpoint client 105 (e.g., client computing device, mobile device, laptop computer, desktop computer, table, smartphone, etc.), a network 110 (e.g., the internet, a wireless network, wired network, etc.), and a network file system 115 (e.g., distributed file system, storage area network, cloud computing platform, etc.). The system 120 may be a data set movement monitor. The system may be executing on a server (e.g., a single server, a cluster of servers, a distributed service, a microservice, a cloud-based service, etc.) of the network file server 115. The system 120 may include a variety of components including a file manager 125, a user account data store 130, a monitored data sets data store 135, a safe zones data store 140, and a data set management console 175. The file manager 125 may include a movement detector 145, a file-data set identifier 150, a notification engine 165, and a comparator 170. The data set management console 175 may include a user manager 155, a group manager 160, a data set creator 180 and a data set configurator 185.

The endpoint device 105 may be used by a user and may include an endpoint client that is communicatively coupled to the system 120 (e.g., via the network 110, etc.). In an example, the endpoint client may communicate with the server of the network file system 115. The endpoint client may track and manage file movement originating from the endpoint 105. File move operations to and from locations accessible by the endpoint device 105 (e.g., local file storage locations, removable storage devices attached to the endpoint device 105, remote file storage locations accessible by the endpoint device, etc.) may be managed by the endpoint client. In an example, the endpoint client may work in conjunction with or may take the place of a file manager of the endpoint device 105. Thus, when a file move operation is initiated by the endpoint device, it will be processed by the endpoint client.

The network file system 115 may manage a network of file storage locations and files distributed across the network 110. The locations may include cloud-based file storage locations, local endpoint file storage locations, centralized server file storage locations, and the like. The system 120 may be executed by the server of the network file system 115 and may be used to track and control file move operations occurring throughout the network file system 115. File move operations may be identified and files associated with the file move operations may be identified to determine if they are members of a sensitive data set. If so, it may be determined if the file move operation is allowed based on the configuration of the sensitive data set. For example, a user may attempt to move a file named text.doc from a remote file storage location to an external hard drive attached to the endpoint device 105 and the operation may be denied because the configuration of a sensitive data set to which the file belongs may not allow moving the file to an external storage device. The evaluation may be completed by the endpoint client executing on the endpoint device 105. A notification may then be transmitted to an administrator of the sensitive data set indicating that the file move operation was attempted and denied. Thus, the file may be prevented from unauthorized egress from the network file system 115.

The data set management console 175 may include a variety of graphical user interfaces that provide the ability to create and configure sensitive data sets. A user management graphical user interface may be generated that provides administrators with the ability to manage users of the network file system. Inputs received by the user management graphical user interface may be received by the user manager 155. The user manager 155 may store user accounts and associated information in the user accounts data store 130. The user accounts in the user accounts data store 130 may be assigned as administrators of a sensitive data set or may be added as a safe user of a safe zone for the sensitive data set. The group manager 160 may manage groups that include user accounts from the user accounts data store 130. Group membership may be included in the user accounts data store 130. The user may use the user management graphical user interface to manage group membership of a user account. Group membership may indicate an organization to which a user account belongs.

A data set creation graphical user interface may be generated that provides an administrator with a variety of user interface elements for providing inputs for data set creation. The provided inputs may be received by the data set creator 180. The data set creator 180 may create a new sensitive data set based on the received inputs. The sensitive data set may be assigned a name (e.g., automatically, by the administrator, etc.) and one or more users of the network file system may be assigned as sensitive data set administrators of the sensitive data set. The users may be assigned from the user accounts stored in the user accounts data store 130. A notification may be transmitted (e.g., automatically, by the administrator, etc.) to the one or more users that they may configure the sensitive data set. For example, a new sensitive data set security container may be created with a name "sensitive data set 1" received from the data set creation graphical user interface and users "John Doe" and "Jane Doe" may be assigned as administrators of sensitive data set 1. A notification may be transmitted to John Doe and Jane Doe indicating that sensitive data set 1 has been created and they have rights to configure sensitive data set 1. The new sensitive data set security container may be stored in the monitored data sets data store 135.

A data set configuration graphical user interface may be generated for the sensitive data set. The received inputs may be used by the data set configurator 185 to configure the sensitive data set. For example, Jane Doe may access the data set configuration graphical user interface and, upon being authenticated, may be presented with configuration user interface elements for sensitive data set 1. Jane Doe, as a data set administrator, may be able to perform a variety of configuration tasks to configure the sensitive data set including, for example, rename the sensitive data set, set a default identification method(s) to use for detecting files, identify sensitive files and directories, update the identification method(s) to use for specific files, set a default safe zone, add users and groups (e.g., user groups, organizations, from the user accounts data store 130, etc.) to a safe group of the sensitive data set, adjust safe zone settings for individual users and groups in the safe group, update the contact(s) and alert settings for the sensitive data set, enable/disable monitoring of the sensitive data set, etc. The safe zones may be stored in the safe zones data store 140.

The configured sensitive data set may include safe zones that define file storage locations (e.g., folders, devices, network locations, etc.) where files that are subject to monitoring may be located. The configuration may include safe groups that may be assigned to the safe zones indicating users and groups that may have visibility and access to monitored files in a safe zone. The configuration may include identification methods for use in identification of monitored files. For example, the identification methods may include a file hash, file name, known data/text for a file, etc. A reference identifier may be generated for a monitored file. For example, a hash may be generated for the file, a file name for the file may be stored, known data or text of a file may be stored. The reference identifier may be stored with the sensitive data set configuration (e.g., in the monitored data sets data store 135, etc.).

Figure 2:
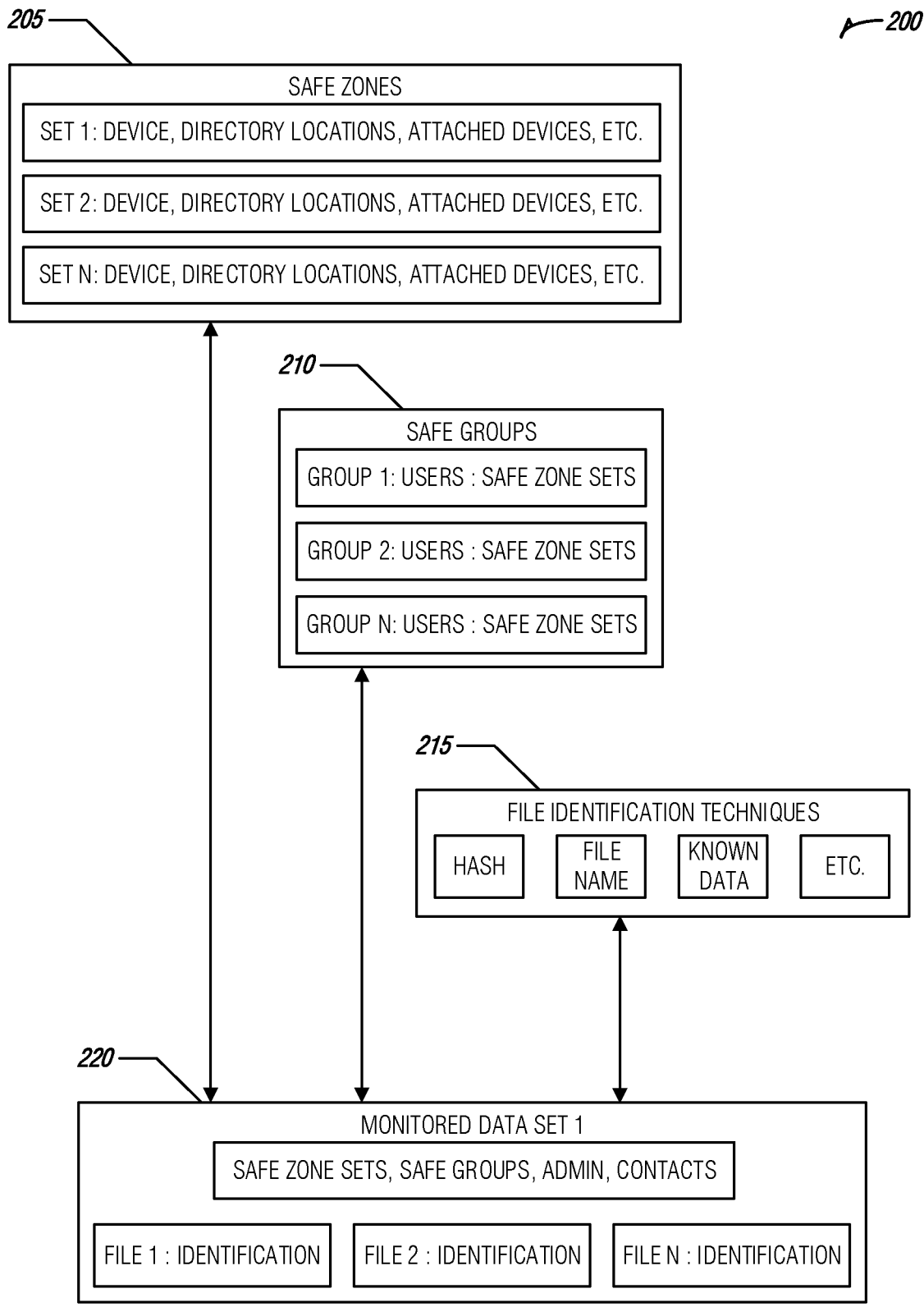
FIG. 2 illustrates a relationship diagram of an example of security containers for sensitive data movement detection, according to an embodiment.

FIG. 2 illustrates a relationship diagram 200 of an example of security containers for sensitive data movement detection, according to an embodiment. Safe zones 205 may be generated that include file storage locations that are designated as being able to store a file included in a sensitive data set. Thus, file operations that move a monitored file to a location designated in a safe zone set for the file may be allowed. File operations that move the file to a location not included in a safe zone set for the file may be denied or reported to the sensitive data set contact(s). Safe groups 210 include sets of users and groups that may conduct file operations that would move a file to a safe zone and have accessibility and visibility to the files in the safe zone. A safe group may be assigned to a safe zone. Thus, a user conducting a file operation that moves a file to a safe zone location may be allowed to perform the operation if the user is in a safe group assigned to a safe zone for the file. Otherwise, the file operation may be denied. The identification techniques 215 indicate identification methods available for identifying monitored files. The monitored data set (e.g., a sensitive data set, etc.) may be configured with safe zones 205, safe groups 210, and identification methods 215. The configuration may be used to identify a monitored file and determine if a file operation should be allowed, if a notification should be transmitted, etc.

Returning to the description of FIG. 1, the endpoint client may include components of the file manager 125 which may be used to identify the file move operation and the file that is associated with the file move operation. The file manager 125 may access the data set configurations to determine actions that should be taken for file move operations. For example, an operation may be allowed, denied, or a notification may be transmitted based on the data set configuration for a file that is the subject of a move operation. In an example, a local copy of the sensitive data set configurations may be maintained on the endpoint device 105. The local copy may be updated periodically, upon detection of an update, and the like.

The movement detector 145 may identify file move operations. The movement detector 145 may identify an attempt to relocate a file that is a member of a monitored data set (e.g., a sensitive data set, etc.). The movement detector 145 may identify the file using an identification method designated in a sensitive data set configuration that includes the file. The movement detector may generate an identifier for the file (e.g., hash value, file name, known text/data, etc.). The comparator 170 may evaluate the generated identifier to determine if it matches a reference identifier for a file included in a sensitive data set.

Figure 3:
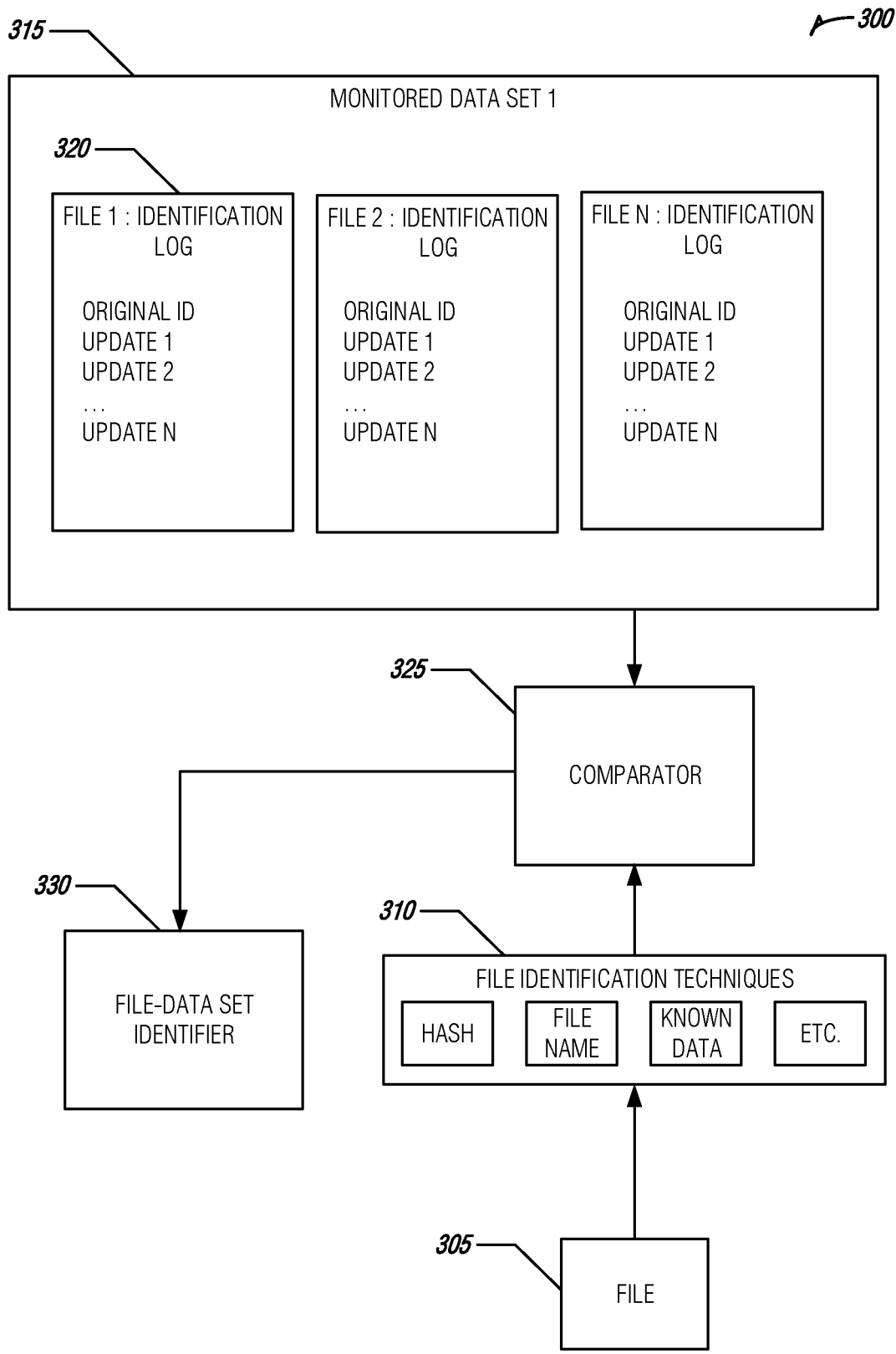
FIG. 3 illustrates a block diagram of an example of file identification for sensitive data movement detection, according to an embodiment.

FIG. 3 illustrates a block diagram 300 of an example of file identification for sensitive data movement detection, according to an embodiment. It may be determined that a file 305 is the subject of a file move operation. The file 305 may be evaluated using one or more file identification techniques 310. A comparator 325 (e.g., comparator 170 as described in FIG. 1, etc.) may work in conjunction with a file-data set identifier 330 (e.g., file data-set identifier 150 as described in FIG. 1, etc.) to determine if the file 305 is a member of a monitored data set 315 (e.g. a sensitive data set, etc.). The identification may be based on evaluation of an identification log 320 that corresponds to the monitored data set 315.

Returning to the description of FIG. 1, in an example, a first hash value may be calculated for the file (e.g., a reference hash value, etc.). The first hash value may be stored in a hash table corresponding to the monitored data set that includes the file. Upon identifying the attempt to relocate the file, a second hash value may be generated for the file. It may be determined that the file is a member of the monitored data set based on a comparison (e.g., by the comparator 170) between the first hash value and the second hash value. For example, movement of a file named "text.doc" may be identified as a member of sensitive data set 1 based on a match (e.g., as determined by the comparator 170) between a reference hash stored for the file and a hash generated for the file by the movement detector 145.

The hash table may be updated when the file is modified. In an example, it may be identified that the file has been modified. A third hash value may be calculated for the file and the hash table may be updated and the determination that the file is the member of the monitored data set may include comparing the second hash value to the third hash value.

In another example, a log of file names may be maintained that corresponds to the monitored data set for the file. A current name of the file may be identified and the determination that the file is the member of the monitored data set may be based on a comparison (e.g., by the comparator 170) between the current file name and an entry in the log of file names. For example, the log of file names may include text.doc and the file name of the file that is subject to the file move operation may be determined to be text.doc. The file may then be identified as a member of the monitored data set.

In another example, a data string included in the file may be identified. The data string may be stored in a file-data string table corresponding to the monitored data set for the file. Upon identifying the attempt to relocate the file, the file may be scanned for the data string and the determination that the file is the member of the monitored data set may be based on locating the data string in the file. For example, a file identifier may be included in the metadata of the file and the file identifier may be stored in the file-data string table. The file that is the subject of the file move operation may be scanned to determine if the file identifier is included in the metadata of the file.

The file-data set identifier 150 may determine a user account associated with the attempt to relocate the file. The user account information may be determined based on a user account that has authenticated with the endpoint client (e.g., based on authentication with the endpoint client, pass-through authentication of user credentials used to login to the endpoint 105, etc.). For example, Jane Doe may have used her credentials to login to the endpoint device 105 or the endpoint client and the user account may be determined based on the logged in credentials.

The file-data set identifier 150 may work in conjunction with the comparator 170 to determine a safe user group for the user account associated with the attempt to relocate the file. The determination of the safe user group membership for the user may be made by comparing the user account to the sensitive data set configuration for the file. For example, the user account for Jane Doe may be determined to be in a safe user group entitled "administrators" based on an evaluation of the configuration for sensitive data set 1. The safe user group may include user accounts, groups, etc. The safe user group provides for granular management of users by assigning them to one or more groups that may then be assigned to one or more safe zones.

The movement detector 145 may obtain a destination for the attempt to relocate the file. For example, the user may be attempting to move the file text.doc from a remote storage location to an external hard drive attached to the endpoint device 105. The endpoint client may identify source and destination storage locations for a file move operation. The source and destination may be logged so that file movement may be tracked. The logging may include the identity of a user account and endpoint device 105 that initiated the file move operation. These features may be used to perform forensic analysis.

The file-data set identifier 150 may work in conjunction with the comparator 170 to determine a safe zone for the monitored data set using the user account and the identification of the monitored data set. The safe group of the user may be associated with one or more safe zones. The comparator 170 may evaluate the configuration for the monitored data set to determine safe zones for the user based on the safe user group. The user account of the user may be in one or more safe user groups which may then be assigned to one or more safe zones. For example, an administrator may be a member of an administrators safe user group that may be assigned to all of the safe zones configured for a sensitive data set while a standard user may be assigned to an accounting safe user group that is assigned only to an accounting safe zone. Thus, different users may be allowed to move a file to different storage locations based on safe user group membership assigned to various safe zones.

The notification engine 165 may provide a notification via the file manager 125 based on the destination for the attempt to relocate the file and the allowed destinations. The notification engine 165 may work in conjunction with the comparator 170 to determine a notification to be transmitted to the user. The comparator 170 may evaluate the safe user group, the safe zone, and the destination to determine if the file move operation is allowed. In an example, the notification may be presented in a graphical user interface of the endpoint client. In another example, the notification may be transmitted via email, text message, system message, and the like.

In an example, it may be determined that the destination is not a member of the safe zone and the attempt to relocate the file may be prevented or reported. The notification may include a message indicating that the attempt to relocate the file was unsuccessful. In an example, a notification may be transmitted by the notification engine 165 to a group of users responsible for managing the monitored data set.

In another example, it may be determined that the destination is a member of the safe zone and the attempt to relocate the file may be allowed. The notification may include a message indicating that the attempt to relocate the file was successful. In an example, no notification may be presented upon success of a file move operation. While no notification may be provided, the file move operation may be stored in a log to provide a forensic record of the file move operation.

Figure 4:
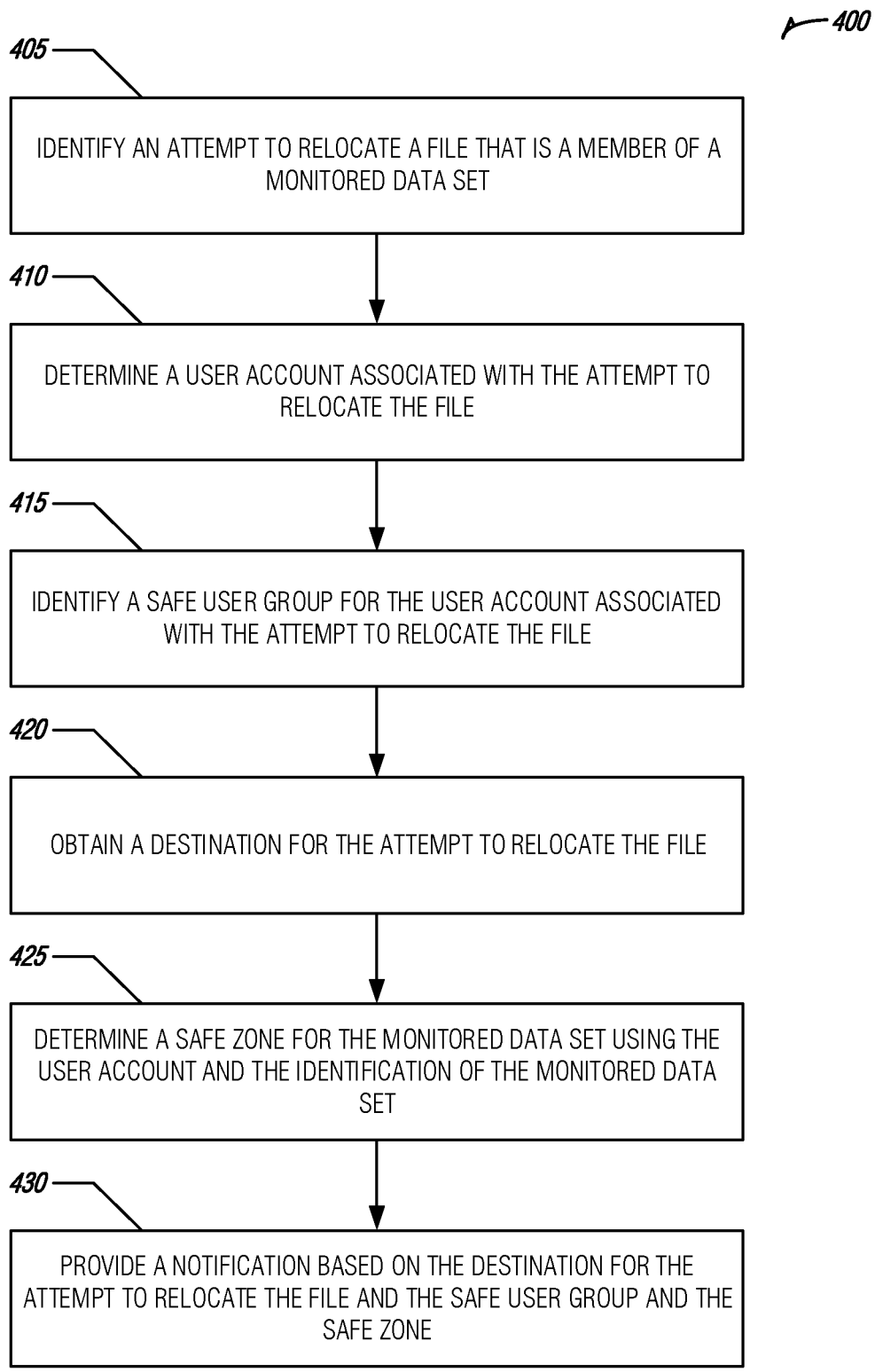
FIG. 4 is a flow diagram of an example of a method for sensitive data movement detection, according to an embodiment.

FIG. 4 is a flow diagram of an example of a method 400 for sensitive data movement detection, according to an embodiment. The method 400 may provide features as discussed in the descriptions of FIGS. 1-3.

An attempt to relocate a file that is a member of a monitored data set may be identified (e.g., by the movement detector 145 as described in FIG. 1, etc.) (e.g., at operation 405). In an example, a first hash value may be calculated for the file (e.g., a reference hash value, etc.). The first hash value may be stored in a hash table corresponding to the monitored data set that includes the file. Upon identifying the attempt to relocate the file, a second hash value may be generated for the file. It may be determined that the file is a member of the monitored data set based on a comparison (by the comparator 170 as described in FIG. 1, etc.) between the first hash value and the second hash value.

The hash table may be updated when the file is modified. In an example, it may be identified that the file has been modified. A third hash value may be calculated for the file and the hash table may be updated and the determination that the file is the member of the monitored data set may include comparing the second hash value to the third hash value.

In another example, a log of file names may be maintained that corresponds to the monitored data set for the file. A current name of the file may be identified and the determination that the file is the member of the monitored data set may be based on a comparison (e.g., by the comparator 170 as described in FIG. 1, etc.) between the current file name and an entry in the log of file names. For example, the log of file names may include text.doc and the file name of the file that is subject to the file move operation may be determined to be text.doc. The file may then be identified as a member of the monitored data set.

In another example, a data string included in the file may be identified. The data string may be stored in a file-data string table corresponding to the monitored data set for the file. Upon identifying the attempt to relocate the file, the file may be scanned for the data string and the determination that the file is the member of the monitored data set may be based on locating the data string in the file. For example, a file identifier may be included in the metadata of the file and the file identifier may be stored in the file-data string table. The file that is the subject of the file move operation may be scanned to determine if the file identifier is included in the metadata of the file.

A user account associated with the attempt to relocate the file may be identified (e.g., at operation 410). A safe user group may be identified for the user account associated with the attempt to relocate the file (e.g., at operation 415). A destination may be obtained for the attempt to relocate the file (e.g., at operation 420). A safe zone may be determined for the monitored data set using the user account and the identification of the monitored data set (e.g., at operation 425).

A notification may be provided (e.g., by the notification engine 170 as described in FIG. 1) via the file manager based on the destination for the attempt to relocate the file and the safe user group and the safe zone. In an example, it may be determined that the destination is not a member of the safe zone and the attempt to relocate the file may be prevented. The notification may include a message indicating that the attempt to relocate the file was unsuccessful. In an example, a notification may be transmitted (e.g., by the notification engine 165 as described in FIG. 1, etc.) to a group of users responsible for managing the monitored data set.

In another example, it may be determined that the destination is a member of the safe zone and the attempt to relocate the file may be allowed. The notification may include a message indicating that the attempt to relocate the file was successful. In an example, no notification may be presented upon success of a file move operation.

Figure 5:
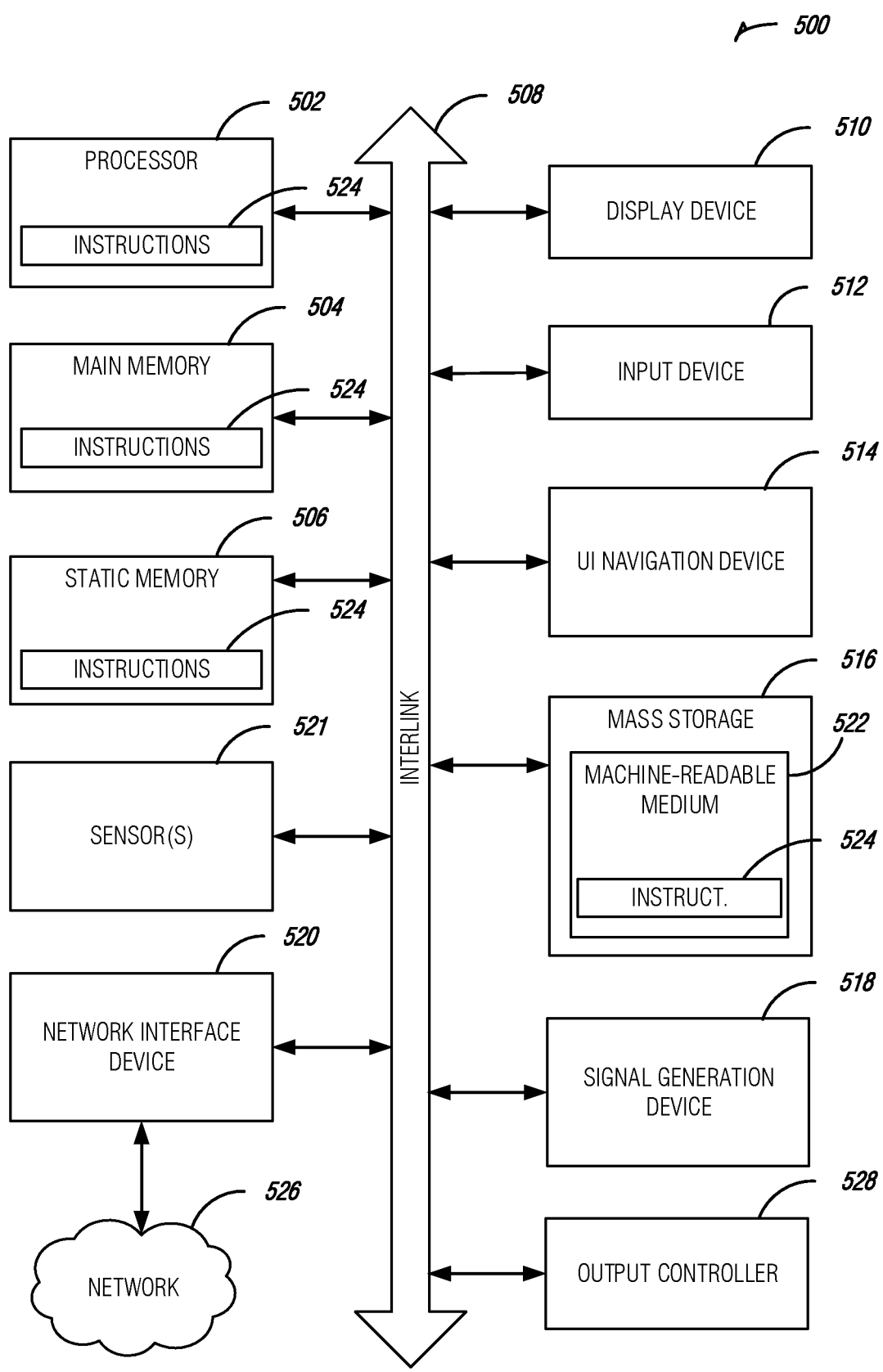
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine readable media). Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

Example 1 is a system for data set movement monitoring, the system comprising: at least one processor; and memory including instructions that, when executed by the at least one processor, cause the at least one processor to perform operations to: identify an attempt to relocate a file that is a member of a monitored data set; determine a user account associated with the attempt to relocate the file; identify a safe user group for the user account associated with the attempt to relocate the file; obtain a destination for the attempt to relocate the file; determine a safe zone for the monitored data set using the user account and the identification of the monitored data set; and provide a notification based on the destination for the attempt to relocate the file and the safe user group and the safe zone.

In Example 2, the subject matter of Example 1 includes, the memory further comprising instructions that cause the at least one processor to perform operations to: determine that the destination is not a member of the safe zone; and prevent the attempt to relocate the file, wherein the notification includes a message that indicates that the attempt to relocate the file was unsuccessful.

In Example 3, the subject matter of Example 2 includes, the memory further comprising instructions that cause the at least one processor to perform operations to transmit a notification to a group of users responsible for management of the monitored data set.

In Example 4, the subject matter of Examples 1-3 includes, the memory further comprising instructions that cause the at least one processor to perform operations to: determine that the destination is a member of the safe zone; and allow the attempt to relocate the file, wherein the notification includes a message that indicates that the attempt to relocate the file was successful.

In Example 5, the subject matter of Examples 1-4 includes, the memory further comprising instructions that cause the at least one processor to perform operations to: calculate a first hash value for the file; store the first hash value in a hash table that corresponds to the monitored data set that includes the file; upon identification of the attempt to relocate the file, calculate a second hash value for the file; and determine that the file is the member of the monitored data set based on a comparison between the first hash value and the second hash value.

In Example 6, the subject matter of Example 5 includes, the memory further comprising instructions that cause the at least one processor to perform operations to: identify that the file has been modified; calculate a third hash value for the file; and update the hash table with the third hash value, wherein the instructions to determine that the file is the member of the monitored data set includes instructions to compare the second hash value to the third hash value.

In Example 7, the subject matter of Examples 1-6 includes, the memory further comprising instructions that cause the at least one processor to perform operations to: maintain a log of file names for the file that corresponds to the monitored data set for the file; identify a current file name of the file; and determine that the file is the member of the monitored data set based on a comparison between the current file name and an entry in the log of file names.

In Example 8, the subject matter of Examples 1-7 includes, the memory further comprising instructions that cause the at least one processor to perform operations to: identify a data string included in the file; store the data string in a file-data string table that corresponds to the monitored data set for the file; upon identification of the attempt to relocate the file, scan the file for the data string; and determine that the file is the member of the monitored data set based on the data string be located in the file.

In Example 9, the subject matter of Examples 1-8 includes, the memory further comprising instructions that cause the at least one processor to perform operations to: determine that a new file has been created in a location corresponding to the monitored data set; generate an identification profile for the new file; and add the new file to the monitored data set.

Example 10 is at least one non-transitory machine-readable medium including instructions for a file manager including data set movement monitoring that, when executed by at least one processor, cause the at least one processor to perform operations to: identify an attempt to relocate a file that is a member of a monitored data set; determine a user account associated with the attempt to relocate the file; identify a safe user group for the user account associated with the attempt to relocate the file; obtain a destination for the attempt to relocate the file; determine a safe zone for the monitored data set using the user account and the identification of the monitored data set; and provide a notification based on the destination for the attempt to relocate the file and the safe user group and the safe zone.

In Example 11, the subject matter of Example 10 includes, the memory further comprising instructions that cause the at least one processor to perform operations to: determine that the destination is not a member of the safe zone; and prevent the attempt to relocate the file, wherein the notification includes a message that indicates that the attempt to relocate the file was unsuccessful.

In Example 12, the subject matter of Example 11 includes, the memory further comprising instructions that cause the at least one processor to perform operations to transmit a notification to a group of users responsible for management of the monitored data set.

In Example 13, the subject matter of Examples 10-12 includes, the memory further comprising instructions that cause the at least one processor to perform operations to: determine that the destination is a member of the safe zone; and allow the attempt to relocate the file, wherein the notification includes a message that indicates that the attempt to relocate the file was successful.

In Example 14, the subject matter of Examples 10-13 includes, the memory further comprising instructions that cause the at least one processor to perform operations to: calculate a first hash value for the file; store the first hash value in a hash table that corresponds to the monitored data set that includes the file; upon identification of the attempt to relocate the file, calculate a second hash value for the file; and determine that the file is the member of the monitored data set based on a comparison between the first hash value and the second hash value.

In Example 15, the subject matter of Example 14 includes, the memory further comprising instructions that cause the at least one processor to perform operations to: identify that the file has been modified; calculate a third hash value for the file; and update the hash table with the third hash value, wherein the instructions to determine that the file is the member of the monitored data set includes instructions to compare the second hash value to the third hash value.

In Example 16, the subject matter of Examples 10-15 includes, the memory further comprising instructions that cause the at least one processor to perform operations to: maintain a log of file names for the file that corresponds to the monitored data set for the file; identify a current file name of the file; and determine that the file is the member of the monitored data set based on a comparison between the current file name and an entry in the log of file names.

In Example 17, the subject matter of Examples 10-16 includes, the memory further comprising instructions that cause the at least one processor to perform operations to:

identify a data string included in the file; store the data string in a file-data string table that corresponds to the monitored data set for the file; upon identification of the attempt to relocate the file, scan the file for the data string; and determine that the file is the member of the monitored data set based on the data string being located in the file.

In Example 18, the subject matter of Examples 10-17 includes, the memory further comprising instructions that cause the at least one processor to perform operations to: determine that a new file has been created in a location corresponding to the monitored data set; generate an identification profile for the new file; and add the new file to the monitored data set.

Example 19 is a method for a file manager including data set movement monitoring, the method comprising: identifying, by the file manager, an attempt to relocate a file that is a member of a monitored data set; determining, by the file manager, a user account associated with the attempt to relocate the file; identifying a safe user group for the user account associated with the attempt to relocate the file; obtaining, by the file manager, a destination for the attempt to relocate the file; determining a safe zone for the monitored data set using the user account and the identification of the monitored data set; and providing a notification via the file manager based on the destination for the attempt to relocate the file and the safe user group and the safe zone.

In Example 20, the subject matter of Example 19 includes, determining that the destination is not a member of the safe zone; and preventing the attempt to relocate the file, wherein the notification includes a message indicating that the attempt to relocate the file was unsuccessful.

In Example 21, the subject matter of Example 20 includes, transmitting a notification to a group of users responsible for managing the monitored data set.

In Example 22, the subject matter of Examples 19-21 includes, determining that the destination is a member of the safe zone; and allowing the attempt to relocate the file, wherein the notification includes a message indicating that the attempt to relocate the file was successful.

In Example 23, the subject matter of Examples 19-22 includes, calculating a first hash value for the file; storing the first hash value in a hash table corresponding to the monitored data set that includes the file; upon identifying the attempt to relocate the file, calculating a second hash value for the file; and determining that the file is the member of the monitored data set based on a comparison between the first hash value and the second hash value.

In Example 24, the subject matter of Example 23 includes, identifying that the file has been modified; calculating a third hash value for the file; and updating the hash table with the third hash value, wherein determining that the file is the member of the monitored data set includes comparing the second hash value to the third hash value.

In Example 25, the subject matter of Examples 19-24 includes, maintaining a log of file names for the file that corresponds to the monitored data set for the file; identifying, by the file manager, a current file name of the file; and determining that the file is the member of the monitored data set based on a comparison between the current file name and an entry in the log of file names.

In Example 26, the subject matter of Examples 19-25 includes, identifying a data string included in the file; storing the data string in a file-data string table corresponding to the monitored data set for the file; upon identifying the attempt to relocate the file, scanning the file for the data string; and determining that the file is the member of the monitored data set based on locating the data string in the file.

In Example 27, the subject matter of Examples 19-26 includes, determining that a new file has been created in a location corresponding to the monitored data set; generating an identification profile for the new file; and adding the new file to the monitored data set.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for data set movement monitoring, the system comprising:
   at least one processor; and
   memory including instructions that, when executed by the at least one processor, cause the at least one processor to perform operations to:
   receive a request to establish a monitored data set corresponding to a data directory;
   gather file data including a set of risk indicators that indicate a sensitivity level for files in the data directory;
   generate a security container that includes files in the data directory identified based on the sensitivity level;
   create a log of file names, a file-data string table, and a hash log for the monitored data set including hash values for files included in the security container using the file data;
   identify an attempt to relocate the file that is a member of the monitored data set;
   determine a user account associated with the attempt to relocate the file;
   identify a safe user group for the user account associated with the attempt to relocate the file;
   obtain a destination for the attempt to relocate the file;
   determine a safe zone for the monitored data set using the user account and the identification of the monitored data set; and
   provide a notification based on the destination for the attempt to relocate the file and the safe user group and the safe zone.

2. The system of claim 1, the memory further comprising instructions that cause the at least one processor to perform operations to:
   determine that the destination is not a member of the safe zone; and
   prevent the attempt to relocate the file, wherein the notification includes a message that indicates that the attempt to relocate the file was unsuccessful.

3. The system of claim 2, the memory further comprising instructions that cause the at least one processor to perform operations to transmit a notification to a group of users responsible for management of the monitored data set.

4. The system of claim 1, the memory further comprising instructions that cause the at least one processor to perform operations to:
   determine that the destination is a member of the safe zone; and
   allow the attempt to relocate the file, wherein the notification includes a message that indicates that the attempt to relocate the file was successful.

5. The system of claim 1, the memory further comprising instructions that cause the at least one processor to perform operations to:
   calculate a first hash value for the file;
   store the first hash value in the hash table that corresponds to the monitored data set that includes the file;
   upon identification of the attempt to relocate the file, calculate a second hash value for the file; and
   determine that the file is the member of the monitored data set based on a comparison between the first hash value and the second hash value.

6. The system of claim 5, the memory further comprising instructions that cause the at least one processor to perform operations to:
   identify that the file has been modified;
   calculate a third hash value for the file; and
   update the hash table with the third hash value, wherein the instructions to determine that the file is the member of the monitored data set includes instructions to compare the second hash value to the third hash value.

7. The system of claim 1, the memory further comprising instructions that cause the at least one processor to perform operations to:
   identify a current file name of the file; and
   determine that the file is the member of the monitored data set based on a comparison between the current file name and an entry in the log of file names.

8. The system of claim 1, the memory further comprising instructions that cause the at least one processor to perform operations to:
   identify a data string included in the file;
   store the data string in the file-data string table that corresponds to the monitored data set for the file;
   upon identification of the attempt to relocate the file, scan the file for the data string; and
   determine that the file is the member of the monitored data set based on the data string be located in the file.

9. The system of claim 1, the memory further comprising instructions that cause the at least one processor to perform operations to:
   determine that a new file has been created in a location corresponding to the monitored data set;
   generate an identification profile for the new file; and
   add the new file to the monitored data set.

10. At least one non-transitory machine-readable medium including instructions for a file manager including data set movement monitoring that, when executed by at least one processor, cause the at least one processor to perform operations to:
    receive a request to establish a monitored data set corresponding to a data directory;
    gather file data including a set of risk indicators that indicate a sensitivity level for files in the data directory;
    generate a. security container that includes files in the data directory identified based on the sensitivity level;
    create a log of file names, a file-data string table, and a hash log for the monitored data set including hash values for files included in the security container using the file data;
    identify an attempt to relocate the file that is a member of the monitored data set;
    determine a user account associated with the attempt to relocate the file;
    identify a safe user group for the user account associated with the attempt to relocate the file;
    obtain a destination for the attempt to relocate the file;
    determine a safe zone for the monitored data set using the user account and the identification of the monitored data set; and
    provide a notification based on the destination for the attempt to relocate the file and the safe user group and the safe zone.

11. The at least one non-transitory machine-readable medium of claim 10, the memory further comprising instructions that cause the at least one processor to perform operations to:
  determine that the destination is not a member of the safe zone; and
  prevent the attempt to relocate the file, wherein the notification includes a message that indicates that the attempt to relocate the file was unsuccessful.

12. The at least one non-transitory machine-readable medium of claim 10, the memory further comprising instructions that cause the at least one processor to perform operations to:
  determine that the destination is a member of the safe zone; and
  allow the attempt to relocate the file, wherein the notification includes a message that indicates that the attempt to relocate the file was successful.

13. The at least one non-transitory machine-readable medium of claim 10, the memory further comprising instructions that cause the at least one processor to perform operations to:
  calculate a first hash value for the file;
  store the first hash value in the hash table that corresponds to the monitored data set that includes the file;
  upon identification of the attempt to relocate the file, calculate a second hash value for the file; and
  determine that the file is the member of the monitored data set based on a comparison between the first hash value and the second hash value.

14. The at least one non-transitory machine-readable medium of claim 13, the memory further comprising instructions that cause the at least one processor to perform operations to:
  identify that the file has been modified;
  calculate a third hash value for the file; and
  update the hash table with the third hash value, wherein the instructions to determine that the file is the member of the monitored data set includes instructions to compare the second hash value to the third hash value.

15. The at least one non-transitory machine-readable medium of claim 10, the memory further comprising instructions that cause the at least one processor to perform operations to:
  identify a data string included in the file;
  store the data string in the file-data string table that corresponds to the monitored data set for the file;
  upon identification of the attempt to relocate the file, scan the file for the data. string; and
  determine that the file is the member of the monitored data set based on the data string being located in the file.

16. A method for a file manager including data set movement monitoring, the method comprising:
  receiving a request to establish a monitored data set corresponding to a data directory;
  gathering file data including a set of risk indicators that indicate a sensitivity level for files in the data directory;
  generating a security container that includes files in the data directory identified based on the sensitivity level;
  creating a log of file names, a file-data string table, and a hash log for the monitored data set including hash values for files included in the security container using the file data;
  identifying, by the file manager, an attempt to relocate a file that is a member of a monitored data set;
  determining, by the file manager, a user account associated with the attempt to relocate the file;
  identifying a safe user group for the user account associated with the attempt to relocate the file;
  obtaining, by the file manager, a. destination for the attempt to relocate the file;
  determining a safe zone for the monitored data set using the user account and the identification of the monitored data set; and
  providing a notification via the file manager based on the destination for the attempt to relocate the file and the safe user group and the safe zone.

17. The method of claim 16, further comprising:
  determining that the destination is not a member of the sate zone; and
  preventing the attempt to relocate the file, wherein the notification includes a message indicating that the attempt to relocate the file was unsuccessful.

18. The method of claim 16, further comprising:
  determining that the destination is a member of the safe zone; and
  allowing the attempt to relocate the file, wherein the notification includes a message indicating that the attempt to relocate the file was successful.

19. The method of claim 16, further comprising:
  calculating a first hash value for the file;
  storing the first hash value in the hash table corresponding to the monitored data set that includes the file;
  upon identifying the attempt to relocate the file, calculating a second hash value for the file; and
  determining that the file is the member of the monitored data set based on a comparison between the first hash value and the second hash value.

20. The method of claim 16, further comprising:
  identifying a data string included in the file;
  storing the data string in the file-data string table corresponding to the monitored data set for the file;
  upon identifying the attempt to relocate the file, scanning the file for the data string; and
  determining that the file is the member of the monitored data set based on locating the data. string in the file.

* * * * *